(12) United States Patent  
Giesa et al.

(10) Patent No.: US 8,926,242 B2  
(45) Date of Patent: Jan. 6, 2015

(54) DEVICE FOR SECURING A MOBILE DEVICE IN AN AIRCRAFT CABIN

(71) Applicant: Airbus Operations GmbH, Hamburg (DE)

(72) Inventors: Hans-Gerhard Giesa, Hamburg (DE); Dieter Behlich, Rietberg (DE); Thomas Rathmann-Ramlow, Ense (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/076,235

(22) Filed: Nov. 10, 2013

(65) Prior Publication Data

US 2014/0061383 A1     Mar. 6, 2014

Related U.S. Application Data

(63) Continuation of application No. PCT/EP2012/001978, filed on May 8, 2012.

(60) Provisional application No. 61/484,726, filed on May 11, 2011.

(51) Int. Cl.
*B64D 11/00*     (2006.01)

(52) U.S. Cl.
CPC ........ *B64D 11/0007* (2013.01); *B64G 2700/66* (2013.01)
USPC .......................................................... 410/77

(58) Field of Classification Search
CPC .......... B64D 9/00; B64D 9/003; B64D 11/00; B64C 1/18; B64C 1/20
USPC .......................................................... 410/77
See application file for complete search history.

(56) References Cited

U.S. PATENT DOCUMENTS

| | | | |
|---|---|---|---|
| 3,823,900 A | 7/1974 | Marechal | |
| 7,429,157 B2 * | 9/2008 | Schulze et al. | 410/69 |
| 7,740,429 B2 * | 6/2010 | Marmur | 410/80 |
| 8,118,524 B2 * | 2/2012 | Schulze et al. | 410/69 |
| 2010/0290855 A1 * | 11/2010 | Strien | 410/77 |

FOREIGN PATENT DOCUMENTS

| | | |
|---|---|---|
| DE | 19812024 | 9/1999 |
| FR | 2820398 | 8/2002 |

OTHER PUBLICATIONS

International Search Report, Aug. 22, 2012.

* cited by examiner

*Primary Examiner* — H Gutman (74) *Attorney, Agent, or Firm* — Greer, Burns & Crain Ltd.

(57) ABSTRACT

A device for securing a mobile device in an aircraft cabin includes a first connection element having a bar receiving member. The device further has a second connection element which includes a bar which is suitable for co-operating with the bar receiving member of the first connection element, the bar being moveable between an unlocking position and a locking position, in which the bar of the second connection element is able to be brought into engagement with the bar receiving member of the first connection element.

20 Claims, 6 Drawing Sheets

DEVICE FOR SECURING A MOBILE DEVICE IN AN AIRCRAFT CABIN

CROSS-REFERENCES TO RELATED APPLICATIONS

This application is a continuation of International Application PCT/EP2012/001978 filed May 8, 2012, designating the United States and published on Nov. 15, 2012 as WO 2012/152432. This application also claims the benefit of the U.S. Provisional Application No. 61/484,726, filed on May 11, 2011, and of the German patent application No. 10 2011 101 228.5 filed on May 11, 2011, the entire disclosures of which are incorporated herein by way of reference.

BACKGROUND OF THE INVENTION

The invention relates to a device which is used to secure a mobile device, in particular a movable transport carriage, in an aircraft cabin.

In modern passenger aircraft, movable transport carriages, so-called trolleys, are currently used to serve the aircraft passengers with meals and drinks during a flight. When they are not in use, the trolleys are put at appropriate storage locations in the aircraft cabin, which are generally located in the region of the galleys of the aircraft. In order to prevent these trolleys from rolling from their storage locations during the take-off and landing of the aircraft or in the event of turbulence, the trolleys are secured in their position by means of an appropriate securing device.

In EP 1 665 172 B1, various systems for securing a trolley in a defined position in an aircraft cabin are described. For example, systems with pins which can be retracted in a base of the aircraft cabin and corresponding pin receiving members provided on the trolleys, so-called tie-down fittings, are used. It is further known to secure trolleys in their position in the aircraft cabin by means of pivot arms or tilting levers which are secured to a monument wall. Finally, belt systems can be used in order to securely tie the trolleys, for example, to a monument wall.

SUMMARY OF THE INVENTION

An object of the invention is to provide a securing device which can be operated in a simple manner and has a small structural volume and by means of which a mobile device, in particular a movable transport carriage, can be securely fixed in a desired position in an aircraft cabin.

This object is achieved by a device for securing a mobile device in an aircraft cabin having the features of claim 1.

A device according to the invention for securing a mobile device, in particular a trolley, in an aircraft cabin comprises a first connection element having a bar receiving member. The first connection element may, for example, be fixed rigidly in a desired position in the aircraft cabin, for example, to a wall of a monument or in an aircraft galley. Alternatively, it is also possible to mount the first connection element on the mobile device. The securing device further comprises a second connection element having a bar which is suitable for co-operating with the bar receiving member of the first connection element. The second connection element is preferably provided to be connected to the mobile device. Alternatively, however, it is also possible to fix the second connection element rigidly in a desired position in the aircraft cabin, for example to a wall of a monument or in an aircraft galley.

The bar of the second connection element is movable, in particular pivotable, for example about a shaft or an articulation, between an unlocking position and a locking position. If the bar is in its unlocking position, it cannot be brought into engagement with the bar receiving member of the first connection element. In its locking position, however, the bar of the second connection element can co-operate with the bar receiving member of the first connection element. The bar is preferably pivotable through an angle of from approximately 45° to approximately 135° between its unlocking position and its locking position. In a particularly preferred manner, an angle is between approximately 70° and approximately 110°. Owing to the pivotable securing of the bar, the bar can be brought in its unlocking position into a position in which it is stowed in a space-saving, non-disruptive manner and in a state protected from damage.

The bar of the second connection element may comprise a first bar element and a second bar element which is movable relative to the first bar element between a first position and a second position. In the unlocking position of the bar, the second bar element may be located in its first position. In contrast, the second bar element may be movable into its second position in order to enable a movement of the bar from its unlocking position into its locking position. That is to say, with the securing device according to the invention, the second bar element is preferably moved relative to the first bar element from its first position into its second position and only subsequently can the bar which comprises the first and the second bar element be moved as a whole from its unlocking position into its locking position. The bar which is located in its locking position can now be positioned accordingly relative to the bar receiving member of the first connection element. If the bar which is located in its locking position has a suitable position relative to the bar receiving member of the first connection element, the second bar element can be moved relative to the first bar element back into its first position again. The bar, that is to say, the bar elements of the bar, can thereby be brought into engagement with the bar receiving member of the first connection element.

The securing device according to the invention is distinguished by a low weight and a small structural size. Furthermore, the securing device is simple and uncomplicated to operate. Finally, existing trolleys and/or aircraft passenger cabins can be retrofitted with the securing device according to the invention in a comparatively simple and cost-effective manner.

The first connection element preferably comprises a base member, which may have a substantially L-shaped cross-section. The first connection element can then be fixed in a simple, space-saving and nonetheless secure manner to a monument which is arranged in the aircraft passenger cabin or a mobile device. Alternatively or in addition, the second connection element may also comprise a base member, which may also have a substantially L-shaped cross-section. A shaft or an articulation, about which the bar of the securing device is pivotable, may be supported in the base member, that is to say, for example, a bore which is formed in the base member. If the bar of the securing device is located in its unlocking position, it preferably abuts the base member of the second connection element in a space-saving manner. In its locking position, however, the bar preferably extends from the base member of the second connection element in order to allow the bar to be able to be brought into engagement with the bar receiving member of the first connection element. In an alternative embodiment of the securing device, the first and/or the second connection element are not provided with their own base member. The components of the connection elements, such as, for example, the bar receiving member or the bar are then preferably integrated in the respective carrier components, that is to say, for example, a trolley or an internal equipment component of an aircraft cabin.

The bar receiving member of the first connection element may be formed by a recess or opening which is formed in the base member of the first connection element. The shape and position of the bar receiving member of the first connection element is preferably adapted to the orientation and the shape of the bar of the second connection element in its locking position. For example, a recess or opening in the base member of the first connection element, which forms the bar receiving member of the first connection element may have a rectangular shape.

The first bar element may be rotatably supported on a shaft of the second connection element. In a similar manner, the second bar element may be rotatably supported on a shaft of the second connection element. For example, the first and/or the second bar element, for example in the region of a bearing portion, may be provided with a bore through which the shaft of the second connection element extends.

In a preferred embodiment of the securing device according to the invention, the second bar element is displacable along a shaft of the second connection element in the direction of the first bar element during movement from its first position into its second position. During movement from its second position into its first position, however, the second bar element may be displaceable along a shaft of the second connection element in a direction orientated away from the first bar element. In such a configuration of the securing device, the second bar element is arranged in its first position in the direction of the shaft of the second connection element with greater spacing from the first bar element than in its second position. In its second position, the second bar element may contact the first bar element.

The second bar element may be resiliently pretensioned into its first position. Opposing ends of a spring which pretensions the second bar element into its first position are preferably supported on the first or the second bar element. For example, the spring may be configured to apply to the first and the second bar element a force which acts along the shaft of the second connection element and by means of which the second bar element is urged along the shaft of the second connection element in a direction orientated away from the first bar element, that is to say, it is pressed away from the first bar element. A second bar element which is resiliently pretensioned into its first position engages independently with the bar receiving member of the first connection element when the bar of the second connection element is located in its locking position and is positioned accordingly relative to the bar receiving member of the first connection element.

A shaft of the second connection element may be supported for displacement in an axial direction. For example, the shaft may be displaceably received in a bore which is formed in the base member of the second connection element. Preferably, the shaft further has a stop face, which co-operates with the second bar element in such a manner that the second bar element is movable from its first position into its second position by displacing the shaft. The stop face may, for example, be an end face of a first portion of the shaft extending perpendicularly relative to the axial direction, which portion has a greater diameter than a second portion of the shaft that is adjacent to the first shaft portion. In such a configuration, the second bar element can be moved in a simple and comfortable manner out of its first position into its second position by displacing the shaft counter to the force of the first spring by means of co-operation with the stop face of the shaft. The spring which resiliently pretensions the second bar element into its first position may then be constructed in the form of a helical spring through which the shaft of the second connection element extends, a centre axis of the spring extending parallel with the shaft of the second connection element between the first and the second bar element of the bar.

The bar of the second connection element may further comprise a guiding device for guiding the movement of the second bar element relative to the first bar element. That is to say, the guiding device is used to guide the movement of the second bar element between its first position and its second position. For example, the guiding device may comprise at least one guiding pin which is connected to the first bar element and which is received in a corresponding guiding pin receiving member of the second bar element. The guiding pin receiving member of the second bar element may be formed by a bore which is formed in the second bar element. The guiding pin preferably extends parallel to the shaft of the second connection element. If desired or necessary, the guiding device may also comprise a plurality of guiding pins which are preferably orientated substantially parallel to each other.

The bar of the second connection element is preferably resiliently pretensioned into its locking position. In principle, the securing device according to the invention may comprise only one spring, which performs the dual function of, on the one hand, pretensioning the second bar element into its second position and, on the other hand, pretensioning the bar as a whole into its locking position. Alternatively, these functions of the securing device according to the invention may also be carried out by means of two springs which are constructed separately from each other. For example, as explained above, a helical spring, whose shaft extends parallel to the shaft of the second connection element may be used to urge the second bar element into its first position. In order to pretension the bar into its locking position, however, it is possible to use, for example, a torsion spring whose ends are supported on the bar, preferably the first bar element or the base member of the second connection element. A bar which is resiliently pretensioned into its locking position has the advantage that it considerably simplifies the operability of the securing device according to the invention. However, the bar must then be pivoted manually from its locking position into its unlocking position.

In addition or alternatively, the securing device may comprise a retention device which is used to fix the bar in its unlocking position. Such a retention device may, for example, comprise a retention pin which is received in a corresponding retention pin receiving member when the bar is located in its unlocking position. The retention pin of the retention device may, for example, be fitted to a side face of the bar, in particular the first bar element, and be provided for being received in a retention pin receiving member, which is constructed in a lateral wall of a recess which is formed in the base member of the second locking element and which receives the bar in its unlocking position. Alternatively, a configuration is also naturally conceivable in which the bar, in particular the first bar element, is provided with a retention pin receiving member which is provided for co-operation with a retention pin which extends from a lateral wall of a recess which is formed in the base member of the second connection element.

The first bar element may comprise a locking portion which is suitable for co-operating with the bar receiving member of the first connection element. Alternatively or in addition, the second bar element may also comprise a locking portion which is suitable for co-operating with the bar receiving member of the first connection element. The locking portion is preferably constructed at a free end of the first and/or the second bar element which faces away from the base member of the second connection element when the bar is in its locking position. The locking portion of the first and/or the second bar element may, for example, be of hook-like form and be configured to co-operate with an edge of a recess or opening which is formed in the base member of the first connection element and which forms the bar receiving member of the first connection element in order to hold the bar in engagement with the bar receiving member.

The securing device according to the invention may further comprise a retention device which is configured to retain a shaft of the second connection element in its bearing position. The retention device may, for example, comprise a retention pin which extends from a peripheral face of the shaft and which is configured to co-operate with a stop face which is formed on the base member of the second connection element in order to limit displacement of the shaft in an axial direction relative to the base member of the second connection element. The retention device consequently prevents undesirable release of the shaft from its bearing position, for example, in a bore which is formed in the base member. At the same time, the retention device allows limited displacement of the shaft relative to the base member which, during normal operation of the securing device, is used to initiate the displacement of the second bar element relative to the first bar element from its first position into its second position.

The second connection element is preferably constructed in such a manner that a shaft of the second connection element, in the event of a failure of the unlocking function of the securing device, is released from its bearing position and can be separated from the bar. In particular, it should be possible for the shaft, if necessary, to be pulled from the bore formed in the base member of the second connection element and consequently also out of the bores formed in the bearing portions of the bar elements. To this end, a bore which is formed in the base member of the second connection element and which preferably rotatably receives the shaft may be at least partially connected to a slot, which may extend from a peripheral face of the bore formed in the base member of the second connection element as far as an outer face of the base member of the second connection element. The slot is preferably constructed in such a manner that the retention pin of the retention device can be guided through the slot in order to thereby allow decoupling of the shaft from the base member, that is to say, to allow the shaft to be disengaged from the hole formed in the base member. With a securing device which is constructed in this manner, it is possible, even in the event of a failure of the unlocking function of the securing device, to move the connection elements of the securing device out of engagement. It is thereby ensured that, for example, a trolley which is fixed in a defined position in an aircraft cabin using the securing device can be repositioned in an emergency, for example when the space taken up by the trolley is required for other purposes, even in the event of a failure of the unlocking function of the securing device.

The shaft of the first connection element may be provided with an actuation head at a free end which may, for example, be an end of the shaft that protrudes from the bore formed in the base member of the second connection element. The actuation head is preferably operatable by a user by means of pressing in order to displace the shaft in an axial direction relative to the base member of the second connection element. In the region of a free end face of the actuation head, a slot may be formed which is suitable for receiving the edge of a coin. If the shaft, as described above, is intended to be released from the base member of the second connection element, for example in the event of a failure of the locking function of the securing device, the shaft can then be rotated using the coin until the retention pin of the retention device is in alignment with the slot which is formed in the base member of the second connection element and which is provided for the passage of the retention pin. Subsequently, the shaft can be removed from the bore formed in the base member of the second connection element. In place of a shaft which can be rotated using a coin, however, other configurations of the second connection element are also conceivable in which the bar can be released safely from the shaft, using finger force, without the use of a special tool.

A mobile device which is suitable for use in an aircraft cabin and which may, for example, be constructed in the form of a trolley, is distinguished in that there is fitted to the mobile device at least a first or at least a second connection element of a securing device described above. For example, the connection element of the securing device may be fitted in the region of an upper edge of the mobile device so that the L-shaped base member of the connection element of the securing device engages over the edge of the mobile device.

An aircraft cabin internal equipment component which may be constructed, for example, in the form of a monument wall, a monument and in particular an aircraft galley, is distinguished in that at least a first or at least a second connection element of a securing device described above is fitted to the aircraft cabin internal equipment component.

BRIEF DESCRIPTION OF THE DRAWINGS

A preferred embodiment of the invention will now be explained in greater detail with reference to the appended schematic drawings, in which.

DETAILED DESCRIPTION OF THE PREFERRED EMBODIMENTS

Figure 1:
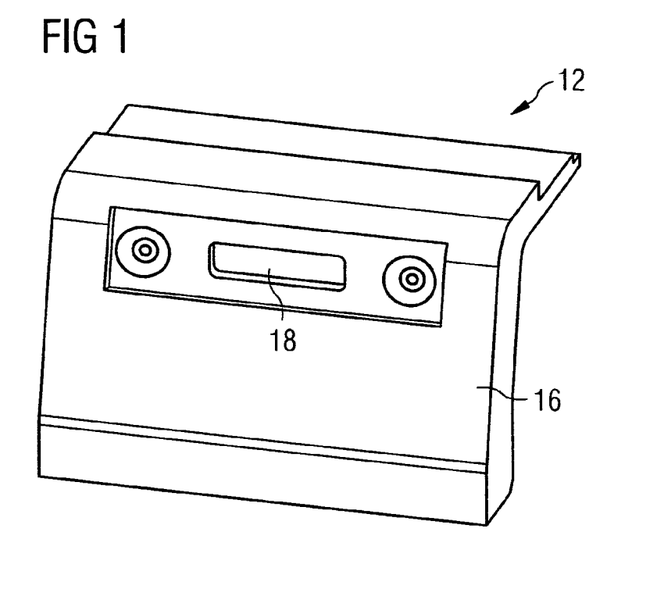
FIG. 1 shows a first connection element of a securing device for securing a mobile device in an aircraft cabin.
Figure 2:
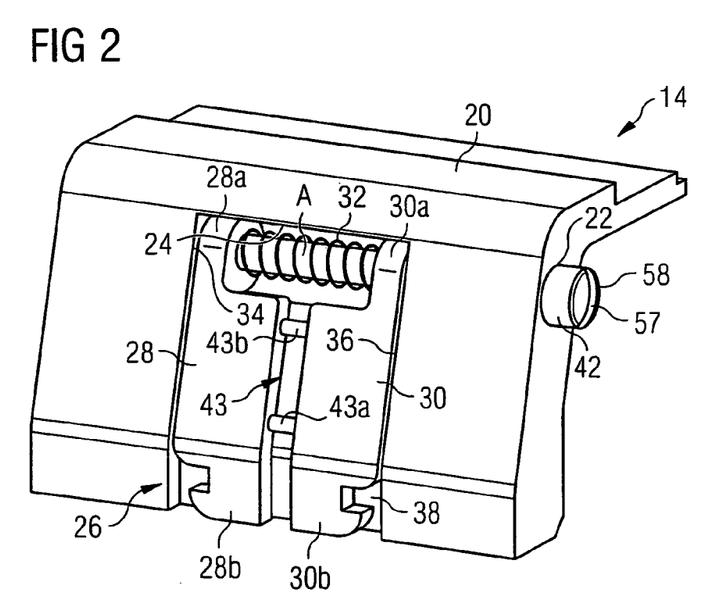
FIG. 2 shows a second connection element of a securing device for securing a mobile device in an aircraft cabin, a bar of the second connection element being located in an unlocking position and a second bar element which is movable relative to a first bar element being arranged in a first position.
Figure 3:
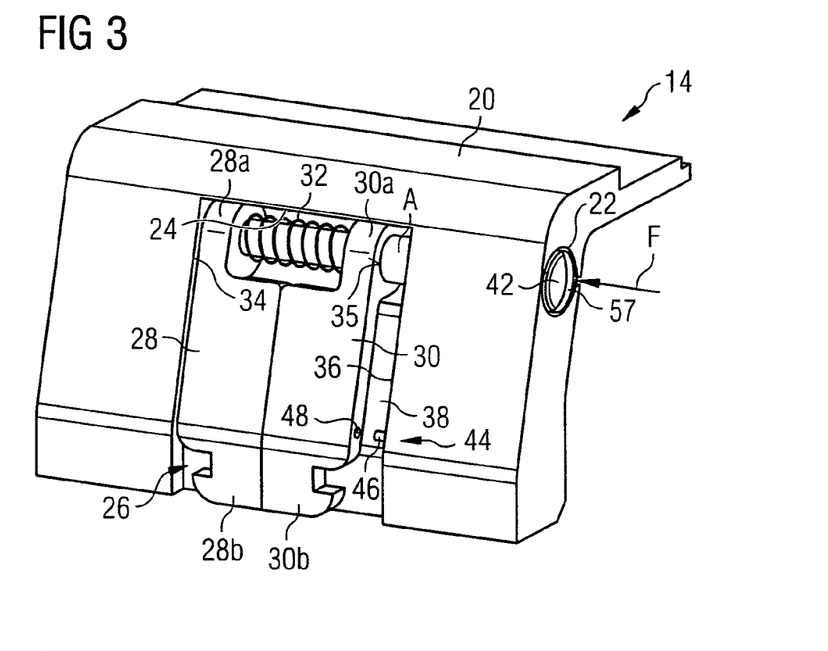
FIG. 3 shows the second connection element according to FIG. 2, but with the second bar element which is movable relative to the first bar element being arranged in a second position.
Figure 4:
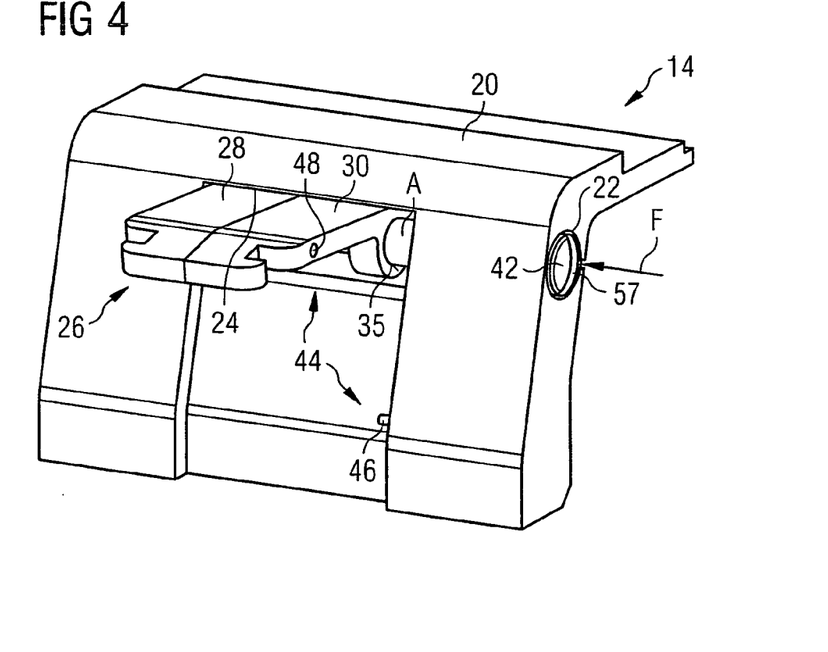
FIG. 4 shows the second connection element according to FIG. 3, but with the bar being located in a locking position.
Figure 5:
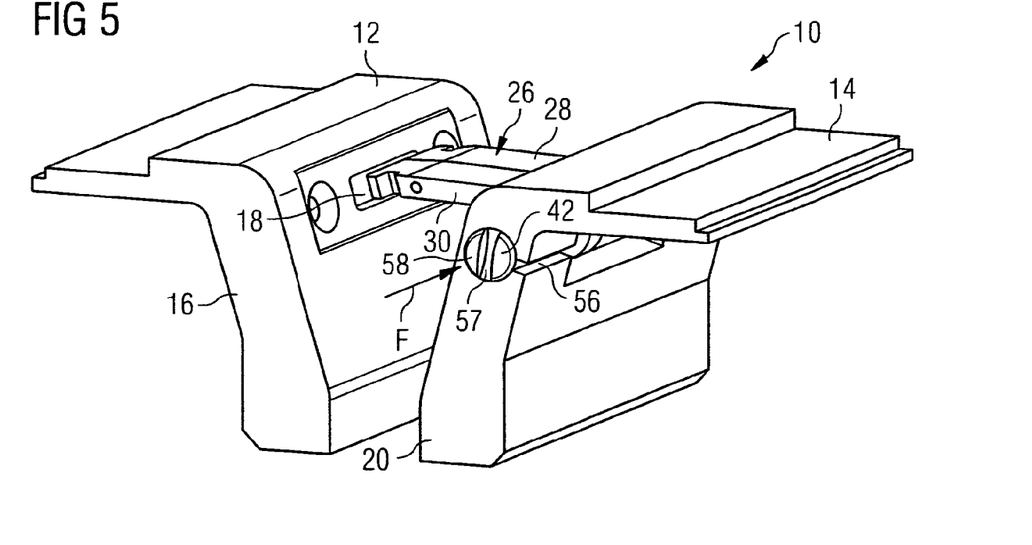
FIG. 5 shows a securing device which comprises the first connection element according to FIG. 1 and the second connection element according to FIGS. 2 to 4 when the bar of the second connection element is being brought into engagement with a bar receiving member of the first connection element.
Figure 6:
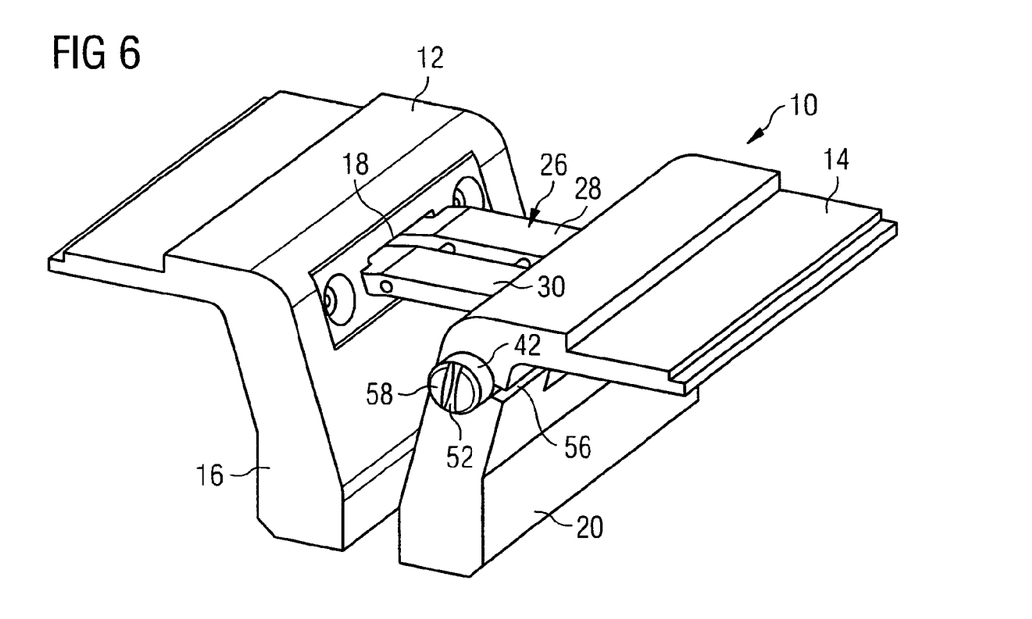
FIG. 6 shows the securing device according to FIG. 5, the bar of the second connection element being in engagement with the bar receiving member of the first connection element.

A device 10 which is used to secure a mobile device, for example a trolley in an aircraft cabin, is illustrated as an overview in FIGS. 5 and 6. The securing device 10 comprises a first connection element 12 which is illustrated in detail in FIG. 1 and a second connection element 14 which is shown in FIGS. 2 to 4. The first connection element 12 has a base member 16 having a substantially L-shaped cross-section. The first connection element 12 comprises a bar receiving member 18 which is formed by an opening which is formed in the base member 16 of the first connection element 12. The opening which forms the bar receiving member 18 is substantially rectangular.

In a similar manner, the second connection element 14 also has a base member 20 having a substantially L-shaped cross-section. In the base member 20 of the second connection element 14 there is formed a bore 22 which serves to receive a shaft A. As can best be seen in FIG. 7d, the bore 22 comprises two portions 22a, 22b which are constructed separately from each other. Between the bore portions 22a, 22b, the shaft A extends freely through a recess 24 which is formed in the base member 20 of the second connection element 14. The shaft A is rotatable relative to the base member 20 of the second connection element 14 and is supported so as to be displaceable in an axial direction in the bore 22 formed in the base member 20 of the second connection element 14.

The second connection element 14 further comprises a bar 26 which is suitable for co-operating with the bar receiving member 18 of the first connection element 18, which itself has a first bar element 28 and a second bar element 30. The bar elements 28, 30 are rotatably supported on the shaft A so as to be displaceable in the direction of the shaft A. To this end, the bar elements 28, 30 are each provided with a bearing portion 28a, 30a. There extends through each of the bearing portions 28a, 30a of the bar elements 28, 30 a bore through which the shaft A extends. The bar elements 28, 30 each further have a hook-like locking portion 28b, 30b. The bar elements 28, 30 and in particular the locking portions 28b, 30b thereof are of such a size and shape that they may move into engagement with the bar receiving member 18 of the first connection element 12, that is to say, in particular the edges of the opening which forms the bar receiving member 18 and which is formed in the base member 16 of the first connection element 12.

As already mentioned, the bar elements 28, 30 are supported so as to be displaceable on the shaft A in an axial direction. In the region of the recess 24 formed in the base member 20 of the second connection element 14, the shaft A extends through a spring 32 which is constructed in the form of a helical spring and whose ends are supported on the first bar element 28 or the second bar element 30. The spring 32 urges the first bar element 28 against a lateral face 34 of the recess 24 and consequently holds the first bar element 28 in the direction of the shaft A in a defined position relative to the base member 20 of the second connection element 14. In a similar manner, the spring 32 urges the second bar element 30 against a stop face 35 which is formed on the shaft A and a second lateral face 36 of the recess 24 facing the first lateral face 34 of the recess 24. This position of the second bar element 30 is referred to in this instance as the first position, see FIG. 2. The stop face 35 is formed by an end face of a first portion of the shaft A that extends perpendicularly relative to the axial direction, which portion has a greater diameter than a second portion of the shaft A that is adjacent to the first axial portion, see FIG. 7d.

Furthermore, FIG. 2 shows the bar 26 of the second connection element 14 in an unlocking position, in which the bar 26, that is to say, the bar elements 28, 30 is/are received in a recess 38 which is constructed in the base member 20 of the second connection element 14. If the lever 26 of the second connection element 14, as shown in FIG. 2, is in its unlocking position, it is consequently stowed in a space-saving manner and in a state protected from damage in the recess 38 formed in the base member 20 of the second connection element 14.

In order to move the bar 26 from its unlocking position illustrated in FIG. 2 into its locking position shown in FIG. 4, as shown in FIG. 3, the shaft A is first displaced in an axial direction relative to the base member 20 of the second connection element 14. This is achieved by applying a pressing force F to an actuation head 42 of the shaft A, which protrudes in the unlocking position of the bar 26 from the bore 22 formed in the base member 20 of the second connection element 14, see FIG. 2. The movement of the second bar element 30 along the shaft A in the direction of the first bar element 28 is guided by a guiding device 43 which comprises two guiding pins 43a which are connected to the first bar element 28. The guiding pins 43a are received in a corresponding guiding pin receiving member of the second bar element 30.

When the shaft A is displaced in an axial direction, the stop face 35 which is formed on the shaft A co-operates with the bearing portion 30b of the second bar element 30, whereby the second bar element 30 is displaced counter to the force of the spring 32 along the shaft A in the direction of the first bar element 28 into a second position, see FIG. 3. Owing to the displacement of the second bar element 30 along the shaft A, a retention device, which is used to fix the bar 26 in its unlocking position shown in FIG. 2, is released. The retention device 44 comprises a retention pin 46 which extends from the lateral face 36 of the recess 38 which is formed in the base member 20 of the second connection element 14 in the direction of the second bar element 30. The retention device 44 further comprises a retention pin receiving member 48 which is provided for receiving the retention pin 46 and which is formed in the region of a lateral face of the second bar element 30 that is opposite the lateral face 36 of the recess 38.

Owing to the release of the retention pin 36 from the retention pin receiving member 38, it becomes possible for the bar 26 to be pivotable from its unlocking position shown in FIG. 2 about the axis A through approximately 90° into its locking position illustrated in FIG. 4. The pivoting of the bar 26 from its unlocking position into its locking position is carried out automatically after the retention device 44 has been released owing to a resilient pretensioning of the bar 26 into its locking position. The resilient pretensioning acting on the bar 26 is produced by means of a spring which is not illustrated in the Figures.

As long as the pressing force F is applied to the actuation head 42 of the shaft A in the locking position of the bar 26, the second bar element 30 is retained in the second position thereof counter to the force of the spring 30. The bar 26 can then, as shown in FIG. 5, be introduced into the bar receiving member 18 of the first connection element 12. Subsequently, as shown in FIG. 6, the actuation head 42 of the shaft A can be released. The spring 32 then urges the second bar element 30 into its first position again, in which the bearing portion 30a of the second bar element 30 is in abutment against the stop face 35 of the shaft A. During the movement of the second bar element 30 from its second position back into its first position, the two hook-like locking portions 28b, 30b of the bar elements 28, 30 move into engagement with the edge of the opening which forms the bar receiving member 18 and which is formed in the base member 16 of the first connection element 12. The connection elements 12, 14 of the securing device 10 are thereby fixed in their position relative to each other.

In order to unlock the securing device 10, it is simply necessary to again apply a pressing force F to the actuation head 42 of the shaft A and to release the bar 26 from the bar receiving member 18. Subsequently, the bar 26 can be manually pivoted again from its locking position according to FIG. 4 into its unlocking position shown in FIG. 1. After the actuation head 42 of the shaft A is released, the spring 32 again urges the second bar element 30 into its first position, the retention pin 46 and the retention pin receiving member 48 of the retention device 44 again moving into engagement with each other in order to fix the bar 26 in its unlocking position.

As can best be seen in FIGS. 7a to 7d, the securing device 10, that is to say, the second connection element 14 of the securing device 10 further comprises a retention device 50 which is configured to retain the shaft A in its bearing position in the hole 22 formed in the base member 20 of the second connection element 14. The retention device 50 comprises a retention pin 52 which extends from a peripheral face of the shaft A. If the shaft A is in its bearing position, the retention pin 52 co-operates with a stop face 54 which is formed on the base member 20 of the second connection element 14. Owing to the co-operation of the retention pin 52 with the stop face 54, the displacement of the shaft A in an axial direction relative to the base member 20 of the second connection element 14 is limited, that is to say, the co-operation of the retention pin 52 with the stop face 54 prevents the shaft A from falling out of the bore 22 formed in the base member 20 of the second connection element 14.

If the securing device 10 is used to fix a mobile device, for example a trolley, in a desired position in an aircraft cabin, it may be necessary, for example in an emergency, to release the connection elements 12, 14 of the securing device 10 from each other even in the event of a failure of the unlocking function of the securing device 10 in order to be able to move the trolley freely in the aircraft cabin. In order to ensure this, there is formed in the base member 20 of the second connection element 14 a slot 56 which connects the bore 22 which is formed in the base member 20 to an outer face of the base member 20 and is sized in such a manner that the retention pin 52 of the retention device 50 can be guided through the slot 56. Furthermore, there is formed in the actuation head 42 of the shaft A, that is to say, in the region of a free end face 58 of the actuation head 42, a slot 57 which is suitable for receiving the edge of a coin 59, see FIGS. 7a to c.

Figure 7A:
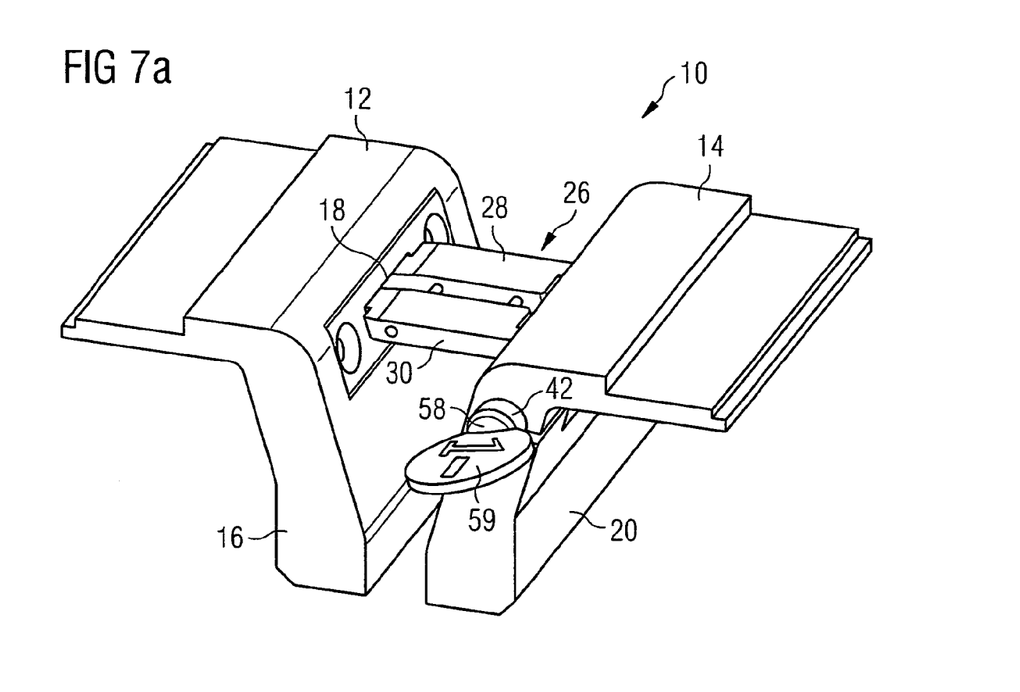
FIGS. 7a to d show the release of a shaft of the second connection element from a base member of the second connection element in the event of a failure of an unlocking function of the securing device.
Figure 7B:
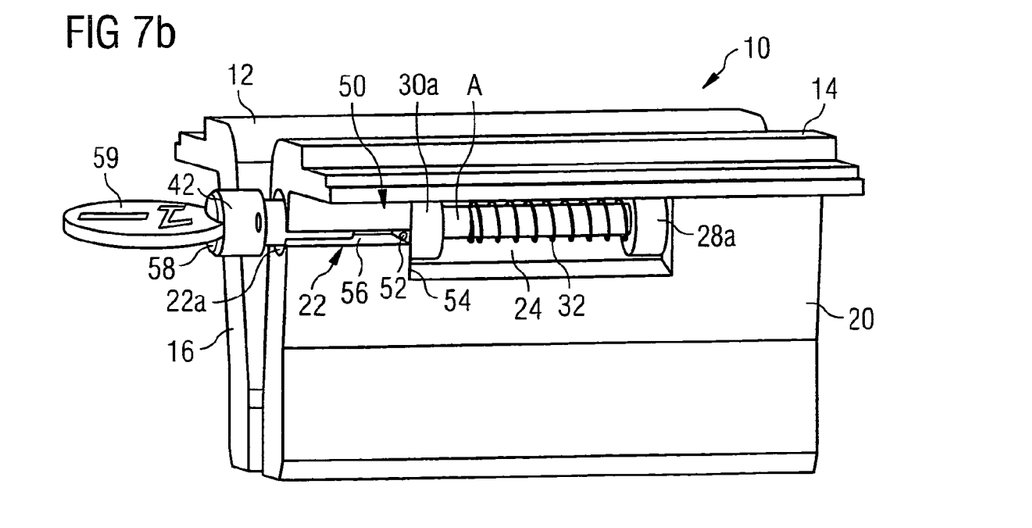
Figure 7C:
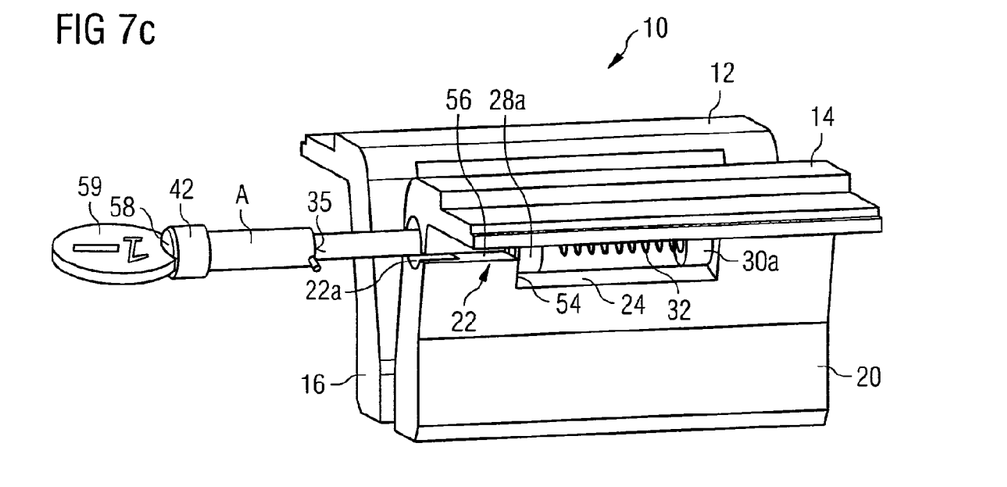
Figure 7D:
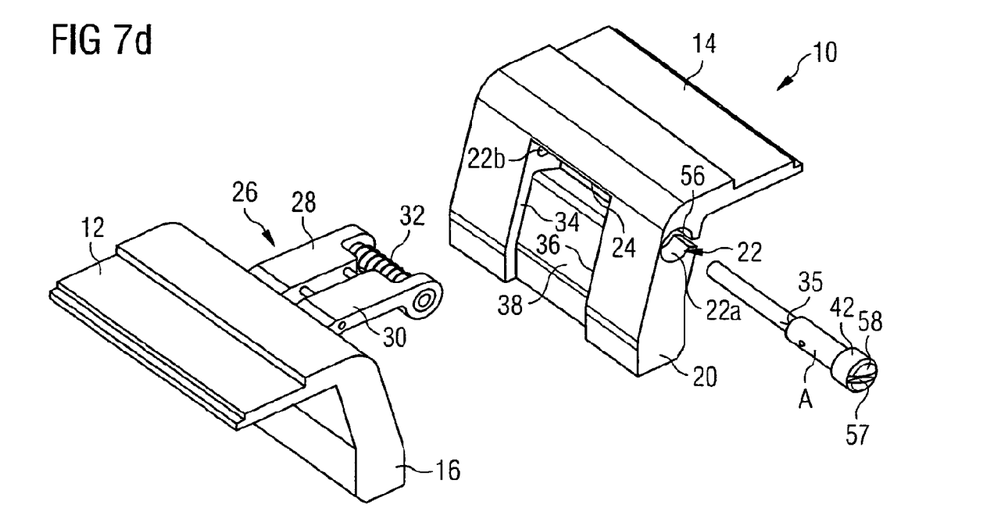

Using the coin 59, the shaft A can be rotated in the bore 22 until the retention pin 52 of the retention device 50 is in alignment with the slot 56 formed in the base member 20 of the second connection element 14, see FIGS. 7a and 7b. Subsequently, the shaft A, as shown in FIGS. 7c and 7d, can be released from the bore 22. It is thereby possible to separate the connection elements 12, 14 of the securing device 10 from each other even when the unlocking function of the securing device 10 fails.

Figure 8:
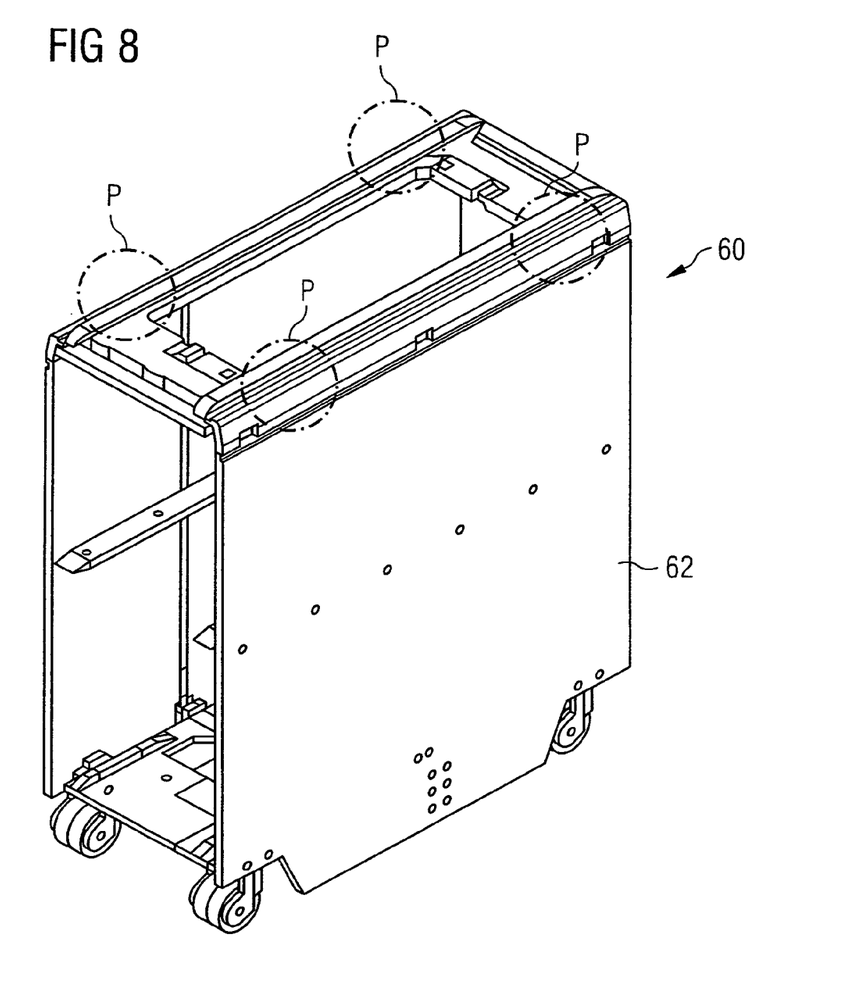
FIG. 8 shows a mobile device which is constructed in the form of a trolley and to which a second connection element of the securing device according to FIGS. 5 and 6 can be fitted.

As shown in FIG. 8, the second connection element 14 of the securing device 10 can be fitted at various positions P in the region of an upper edge of a mobile device 60 which is in the form of a trolley. In particular, the securing of the second connection element 14 to the mobile device 16 is carried out in such a manner that the base member 20 of the second connection element 14 engages over an upper edge of the mobile device 16. In its unlocking position, the bar 26 then extends parallel with a lateral face 62 of the mobile device 60, whereas the bar 26 in its locking position protrudes away from the lateral face 62 of the mobile device 60 at an angle of approximately 90°.

However, the first connection element 12 of the securing device 10 can be secured to a monument, a monument wall or a body of an aircraft galley.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for securing a mobile device in an aircraft cabin, comprising:
   a first connection element comprising a bar receiving member, and
   a second connection element comprising a bar which is suitable for co-operating with the bar receiving member of the first connection element, the bar being moveable between an unlocking position and a locking position, in which the bar of the second connection element is able to be brought into engagement with the bar receiving member of the first connection element,
   wherein the bar of the second connection element comprises a first bar element and a second bar element which is moveable relative to the first bar element between a first position and a second position, the second bar element being located in its first position in the unlocking position of the bar, being moveable into its second position in order to enable a movement of the bar, being moveable into its first position again in order to bring the bar into engagement with the bar receiving member of the first connection element.

2. The device according to claim 1, wherein at least one of the first and the second connection element comprises a base member having a substantially L-shaped cross-section.

3. The device according to claim 1, wherein the bar receiving member of the first connection element is formed by a recess or opening which is formed in the base member of the first connection element and whose shape and position is adapted to the orientation and the shape of the bar of the second connection element in its locking position.

4. The device according to claim 1, wherein the first and the second bar element are rotatably supported on a shaft.

5. A device for securing a mobile device in an aircraft cabin, comprising:
   a first connection element comprising a bar receiving member, and a second connection element comprising a bar which is suitable for co-operating with the bar receiving member of the first connection element, the bar being moveable between an unlocking position and a locking position, in which the bar of the second connection element is able to be brought into engagement with the bar receiving member of the first connection element,
   wherein the bar of the second connection element comprises a first bar element and a second bar element which is moveable relative to the first bar element between a first position and a second position,
   wherein the second bar element, during movement from its first position into its second position, is displaceable along a shaft of the second connection element in the direction of the first bar element.

6. The device according to claim 1, wherein the second bar element, during movement from its second position into its first position, is displaceable along the shaft in the direction orientated away from the first bar element.

7. A device for securing a mobile device in an aircraft cabin, comprising:
- a first connection element comprising a bar receiving member, and
- a second connection element comprising a bar which is suitable for co-operating with the bar receiving member of the first connection element, the bar being moveable between an unlocking position and a locking position, in which the bar of the second connection element is able to be brought into engagement with the bar receiving member of the first connection element,
- wherein the bar of the second connection element comprises a first bar element and a second bar element which is moveable relative to the first bar element between a first position and a second position,
- wherein the second bar element is resiliently pretensioned into its first position.

8. The device according to claim 1, wherein a shaft of the second connection element is supported for displacement in an axial direction and has a stop face which co-operates with the second bar element in such a manner that the second bar element is moveable from its first position into its second position by displacing the shaft in an axial direction.

9. The device according to claim 1, wherein the bar comprises a guiding device for guiding the movement of the second bar element relative to the first bar element, the guiding device comprising at least one guiding pin which is connected to the first bar element and which is received in a corresponding guiding pin receiving member of the second bar element.

10. The device according to claim 1, wherein the bar is resiliently pretensioned into its locking position.

11. The device according to claim 1, wherein the bar is fixable in its unlocking position by means of a retention device, the retention device comprising a retention pin which is received in a corresponding retention pin receiving member when the bar is located in its unlocking position.

12. A device for securing a mobile device in an aircraft cabin, comprising:
- a first connection element comprising a bar receiving member, and
- a second connection element comprising a bar which is suitable for co-operating with the bar receiving member of the first connection element, the bar being moveable between an unlocking position and a locking position, in which the bar of the second connection element is able to be brought into engagement with the bar receiving member of the first connection element,
- wherein the bar of the second connection element comprises a first bar element and a second bar element which is moveable relative to the first bar element between a first position and a second position,
- wherein at least one of the first and the second bar element comprise a locking portion which is suitable for co-operating with the bar receiving member of the first connection element and which is in particular constructed in a substantially hook-like manner.

13. The device according to claim 1, further comprising a retention device which is configured to retain a shaft of the second connection element in its bearing position, the retention device in particular comprising a retention pin which extends from a peripheral face of the shaft and which is configured to co-operate with a stop face which is formed on the base member of the second connection element in order to limit displacement of the shaft in an axial direction relative to the base member of the second connection element.

14. The device according to claim 13, wherein a bore which is formed in the base member of the second connection element and which rotatably receives a shaft of the second connection element is at least partially connected to a slot which is formed in the base member of the second connection element and through which the retention pin of the retention device can be guided in order to release the shaft from the bore which is formed in the base member of the second connection element.

15. The device according to claim 1, wherein a shaft of the second connection element is provided at a free end with an actuation head which is operable by a user in order to displace the shaft in an axial direction, there preferably being formed in the region of a free end face of the actuation head a slot which is suitable for receiving the edge of a coin.

16. A mobile device for use in an aircraft cabin, wherein there is fitted to the mobile device at least a first or at least a second connection element of a securing device according to claim 1.

17. Aircraft cabin internal equipment component, wherein there is fitted to the aircraft cabin internal equipment component at least a first or at least a second connection element of a securing device according to claim 1.

18. The device according to claim 5, wherein the first and the second bar element are rotatably supported on a shaft.

19. The device according to claim 8, wherein the first and the second bar element are rotatably supported on a shaft.

20. The device according to claim 12, wherein the first and the second bar element are rotatably supported on a shaft.

* * * * *